(12) United States Patent
Yan et al.

(10) Patent No.: US 11,195,020 B1
(45) Date of Patent: Dec. 7, 2021

(54) SYSTEMS AND METHODS FOR MAINTAINING VIRTUAL SPACES

(71) Applicant: Facebook Technologies, LLC, Menlo Park, CA (US)

(72) Inventors: Chengyuan Yan, Fremont, CA (US); Amrutha Hakkare Arunachala, Sunnyvale, CA (US); Chengyuan Lin, Redwood City, CA (US); Anush Mohan, Mountain View, CA (US); Ke Huo, Fremont, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 8 days.

(21) Appl. No.: 16/667,361

(22) Filed: Oct. 29, 2019

(51) Int. Cl.
*G06K 9/00* (2006.01)
*G06F 3/01* (2006.01)
*H04L 29/06* (2006.01)
*G06T 15/20* (2011.01)

(52) U.S. Cl.
CPC ......... *G06K 9/00671* (2013.01); *G06F 3/012* (2013.01); *G06T 15/205* (2013.01); *H04L 67/38* (2013.01); *G06T 2210/56* (2013.01); *G06T 2210/61* (2013.01)

(58) Field of Classification Search
CPC ..... G06K 9/0067; G06F 3/012; G06T 15/205; G06T 2210/56; G06T 2210/61; H04L 67/38
See application file for complete search history.

(56) References Cited

U.S. PATENT DOCUMENTS

| | | | |
|---|---|---|---|
| 2011/0310227 A1* | 12/2011 | Konertz | G06T 19/006 348/46 |
| 2014/0267234 A1* | 9/2014 | Hook | G06T 19/006 345/419 |
| 2015/0097719 A1* | 4/2015 | Balachandreswaran | A63F 13/5255 342/147 |
| 2015/0109480 A1* | 4/2015 | Wang | G06T 11/60 348/239 |
| 2017/0243403 A1* | 8/2017 | Daniels | G06T 19/20 |
| 2018/0095542 A1* | 4/2018 | Mallinson | G06F 1/163 |

* cited by examiner

*Primary Examiner* — Jitesh Patel
(74) *Attorney, Agent, or Firm* — Foley & Lardner LLP

(57) ABSTRACT

Systems and methods for providing a virtual space for multiple devices can include a first device having at least one sensor configured to acquire a spatial information of a physical space of the first device. The first device may include at least one processor configured to establish, according to the acquired spatial information, a virtual space corresponding to the physical space, that is accessible by a user of the first device via the first device. The at least one processor may further be configured to register a second device within the physical space, to allow a user of the second device to access the virtual space via the second device.

20 Claims, 4 Drawing Sheets

SYSTEMS AND METHODS FOR MAINTAINING VIRTUAL SPACES

FIELD OF DISCLOSURE

The present disclosure is generally related to virtual spaces, including but not limited to establishing and maintaining a virtual space for a plurality of devices.

BACKGROUND

Artificial reality, such as a virtual reality (VR), an augmented reality (AR), or a mixed reality (MR), provides immersive experience to a user. In one example, a user wearing a head mounted display (HMD) can rotate his head, and an image of a virtual object corresponding to a location of the HMD and a gaze direction of the user can be displayed on the HMD to allow the user to feel as if the user is moving within a space of an artificial reality (e.g., a VR space, an AR space, or a MR space).

Artificial reality content, as part of games for instance, may be made available to users via their respective user devices. Different devices may have different capabilities for interacting with the artificial reality content.

SUMMARY

In one aspect, this disclosure is directed to a method. The method may include acquiring, by a first device, spatial information of a physical space of the first device. The method may include establishing, by the first device according to the acquired spatial information, a virtual space corresponding to the physical space, that is accessible by a user of the first device via the first device. The method may include registering, by the first device, a second device within the physical space, to allow a user of the second device to access the virtual space via the second device.

In some embodiments, the method further includes scanning, by the first device, the physical space to acquire the spatial information, the spatial information comprising a boundary description of the physical space. In some embodiments, the method further includes generating, by the first device according to the acquired spatial information, a three dimensional point cloud representative of at least a portion of the physical space. In some embodiments, the method further includes sharing, by the first device with the second device, information including at least one of the spatial information of the physical space, a location of the first device in relation to the physical space or the virtual space, or an orientation of the first device in relation with the physical space or the virtual space.

In some embodiments, registering the second device includes identifying, by the first device (e.g., according to data from the second device), the second device or a user of the second device. In some embodiments, the first device and second device are connected to a common network. In some embodiments, the method further includes receiving, by the first device, at least one of location or orientation information of the second device, from a third device or directly from the second device. In some embodiments, the method further includes detecting, by the first device, an object or feature of the physical space. The method may further include providing a representation of the object or feature in the virtual space for the first device and the second device. In some embodiments, the method further includes scanning, by the first device, a marker of the object. The method may further include providing a representation of the object within the virtual space according to the scanned marker. The method may further include updating, according to movement of the marker, an orientation and location of the representation of the object in the virtual space.

In another aspect, this disclosure is directed a non-transitory computer readable medium storing instructions when executed by one or more processors cause the one or more processors to acquire a spatial information of a physical space of the first device. The instructions may further cause the processor(s) to establish, according to the acquired spatial information, a virtual space corresponding to the physical space, that is accessible by a user of the first device via the first device. The instructions may further cause the processor(s) to register a second device within the physical space, to allow a user of the second device to access the virtual space via the second device In another aspect, this disclosure is directed to a first device. The first device may include at least one sensor configured to acquire a spatial information of a physical space of the first device. The first device may include at least one processor configured to establish, according to the acquired spatial information, a virtual space corresponding to the physical space, that is accessible by a user of the first device via the first device. The at least one processor may further be configured to register a second device within the physical space, to allow a user of the second device to access the virtual space via the second device.

In some embodiments, the at least one sensor is configured to scan the physical space to acquire the spatial information, the spatial information comprising a boundary description of the physical space. In some embodiments, the at least one processor is configured to generate, according to the acquired spatial information, a three dimensional point cloud representative of at least a portion of the physical space. In some embodiments, the at least one processor is configured to share, with the second device, information including at least one of the spatial information of the physical space, a location of the first device in relation to the physical space or the virtual space, or an orientation of the first device in relation with the physical space or the virtual space.

In some embodiments, the at least one processor is configured to register the second device by identifying, according to data from the second device for instance, the second device or a user of the second device. In some embodiments, the first device and second device are connected to a common network. In some embodiments, the first device further includes a network interface configured to receive at least one of location or orientation information of the second device, from a third device or directly from the second device. In some embodiments, the at least one processor is configured to detect an object or feature of the physical space, and provide a representation of the object or feature in the virtual space for the first device and the second device. In some embodiments, the at least one sensor is configured to scan a marker of the object, and the at least one processor is configured to provide a representation of the object within the virtual space according to the scanned marker, and update, according to movement of the marker, an orientation and location of the representation of the object in the virtual space. In some embodiments, the first device includes an augmented reality device and the second device includes a virtual reality device.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

DETAILED DESCRIPTION

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Disclosed herein are systems and methods for establishing and/or using a virtual space with which different input devices can register and interact. A first device (e.g., an augmented reality (AR) device) can acquire spatial information of a physical space of the first device. The first device can establish a virtual space corresponding to the physical space according to the acquired spatial information. The virtual space can be accessible by a user of the first device via the first device. The first device can register a second device (e.g., virtual reality (VR) device) with the physical space to allow a user of the second device to access the virtual space (e.g., established by the first device) via the second device. By establishing the virtual space, both AR and VR devices may be co-located in the same physical environment, and users of the AR and VR devices may be capable of interacting with one another in the virtual space. Users may be capable of manipulating object representations (e.g., tangible object representations corresponding to physical objects in the physical environment, scene object representations which do not correspond to physical objects in the physical environment, etc.). Various other benefits of the systems and methods described herein shall become apparent as follows.

Figure 1:
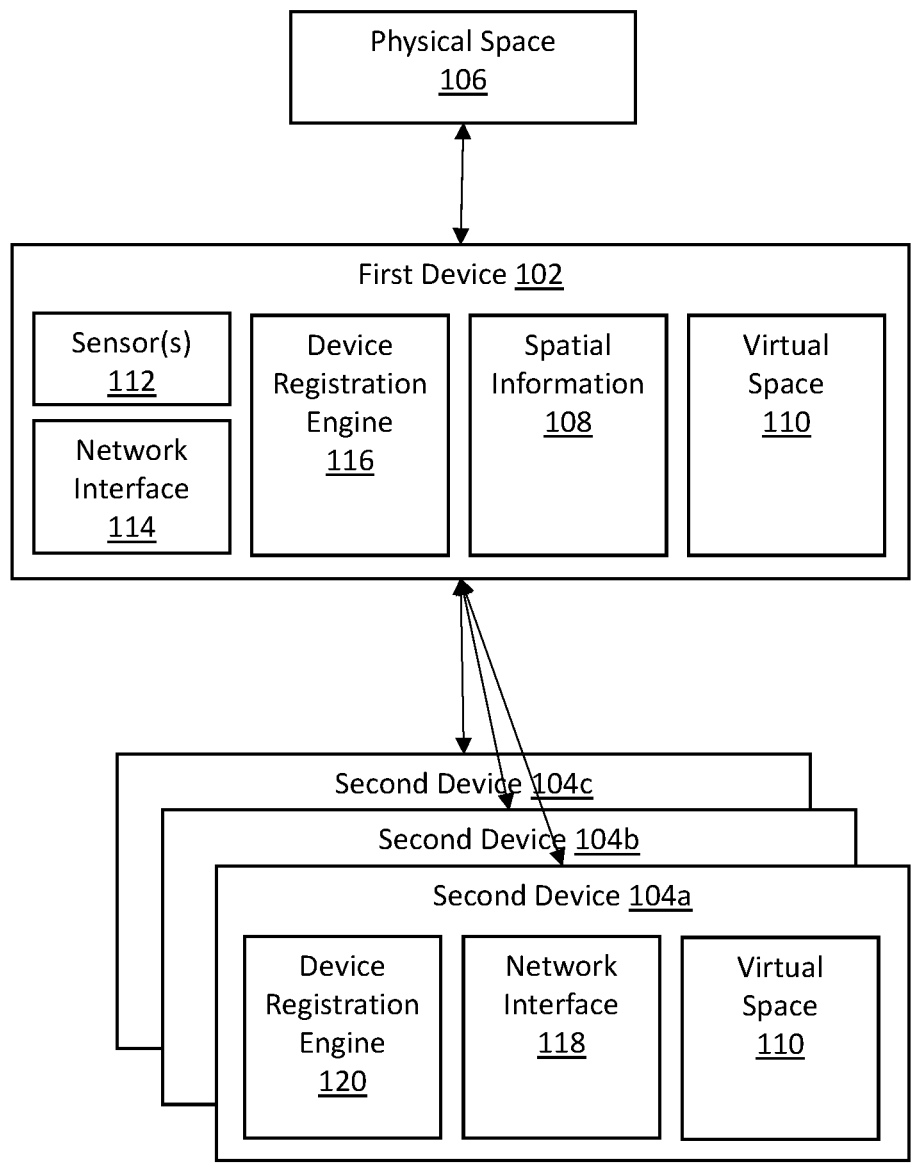
FIG. 1 is a diagram of a system for maintaining a virtual space, according to an example implementation of the present disclosure.

FIG. 1 is a block diagram of a system 100 for maintaining a virtual space, according to an illustrative embodiment. The system 100 is shown to include a first device 102 and one or more second device(s) 104. The first and second devices 102, 104 (and their users) may be located in the same physical space 106, e.g., proximate to each other. As described in greater detail below, the first device 102 may be configured to obtain spatial information 108 (e.g., information about at least one boundary, edge, surface, wall, ceiling, floor, dimensional, object or structural feature) corresponding to the physical space 106. The first device 102 may be configured to establish a virtual space 110 corresponding to (e.g., having or consistent with at least some of the dimensions, orientation and/or features of) the physical space 106 according to the spatial information 108. The first device 102 may be configured to register the second device(s) 104 with the virtual space such that a user of the second device 104 can access (e.g., view, explore, interact with, immersively experience) the virtual space 110 (e.g., established by the first device 102).

Figure 4:
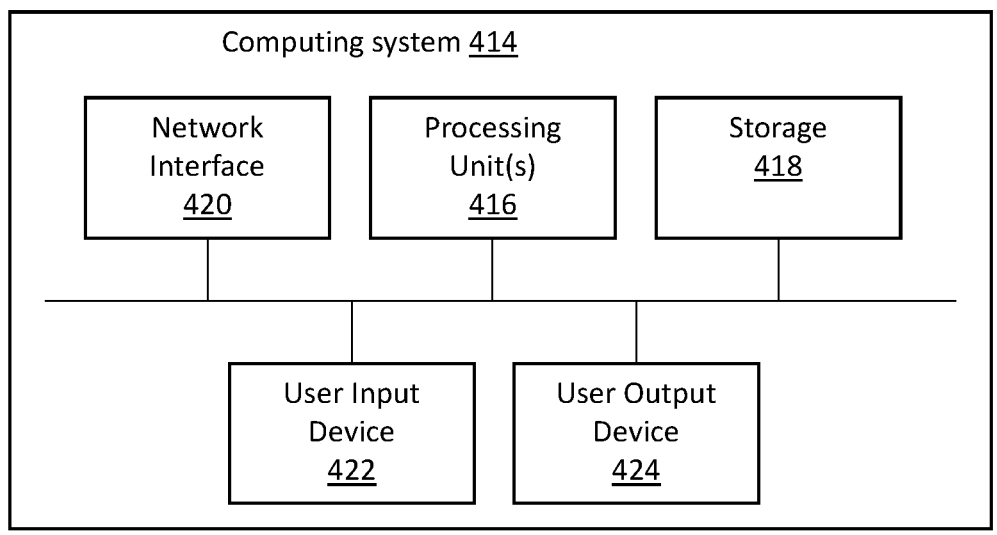
FIG. 4 is a block diagram of a computing environment according to an example implementation of the present disclosure.

Various components and elements of the system 100 may be implemented on or using components or elements of the computing environment shown in FIG. 4 and subsequently described. For instance, the first and second devices 102, 104 may include or incorporate a computing system similar to the computing system 416 shown in FIG. 4 and subsequently described. The first and second devices 102, 104 may include one or more processing unit(s) 416, storage 418, a network interface 420, user input device 422, and/or user output device 424.

The system 100 is shown to include a first device 102. The first device 102 may include or correspond to any device or component configured to capture, detect, register, scan for, or otherwise obtain spatial information of the physical space 106 of the first device 102. The first device 102 may be configured to generate, configure, define, or otherwise establish a virtual space 110 corresponding to the physical space 106 based on the spatial information 108. The first device 102 may be a master (or primary, or host) device corresponding to the virtual space 110. In this regard, the first device 102 may be responsible for establishing and controlling registration or enrollment of the objects, other devices (such as the second device(s) 104), etc., with the virtual space 110.

The first device 102 may include an augmented reality (AR) device. The first device 102 may include a mobile device, tablet device, gaming system, laptop or desktop computer, wearable device, etc. The first device 102 may be configured for a particular modality for supporting a type of artificial reality experience (e.g., AR, VR, via 2-dimensional display rendering, and so on), e.g., for supporting user inputs to control aspects of the artificial reality experience or to interact with the corresponding artificial reality. For instance, the first device 102 may be configured for a modality corresponding to an AR environment (e.g., included in the virtual space 110). A user of the first device 102 may provide inputs (e.g., via the first device 102) for interacting in (e.g., experiencing, navigating, manipulating, using and/or controlling) the AR environment. In some embodiments, the first device 102 may include some elements of the device shown in FIG. 4 and subsequently described. The user may provide inputs for interacting with or controlling a virtual character (e.g., an avatar) in the AR environment. The first device 102 may be a wearable device (e.g., including a head-mounted display). The first device 102 may include an input device communicably coupled to the wearable device. Together, the user may operate the input device and first device 102 to provide inputs for controlling a virtual character's actions within an AR environment. The user may control the virtual character's actions through various human-computer interface components and capabilities. In some implementations, the input device may include a joystick (physical or virtual), controller, keyboard, mouse, touchpad or other device including a plurality of buttons. The user may provide inputs to the input device for controlling the actions of the virtual character.

The first device 102 may include one or more sensor(s) 112. The sensor(s) 112 may be or include any device(s) or component(s) designed or implemented to capture, obtain, detect, measure, register, or otherwise acquire data corresponding to a physical environment of the first device 102 including various objects located therein. In some embodiments, the sensor(s) 112 may include two or more sensors 112 working independently of or together with one another.

The sensor(s) 112 may include, for instance, a combination of camera(s), ranging and/or distance sensor(s) (such as LIDAR or RADAR sensors), and the like. The sensor(s) 112 may be configured to acquire data corresponding to a physical environment of the first device 102 for use or processing by the first device 102. As described in greater detail below, the first device 102 may be configured to acquire spatial information of the physical space 106 of the first device 102 for establishing a virtual space 110 corresponding to the physical space 106.

The first device 102 may be configured to capture, detect, register, obtain, or otherwise acquire spatial information 108 of the physical space 106 of the first device 102. The spatial information 108 may include information or data which defines, represents, describes or otherwise characterizes a spatial relationship, distance or orientation, physical attributes or other boundary information of the physical space 106 of the first device 102. The spatial information 108 may define or describe physical attributes of the wall(s), ceiling, and floor of the physical space 106, objects included in the physical space 106, and so forth. The first device 102 may be configured to acquire the spatial information 108 of the physical space 106 using data from the sensor(s) 112. In some implementations, a user of the first device 102 may be configured manipulate or control the first device 102 to acquire the spatial information 108 of the physical space 106. For instance, the user may be configured to select an option (e.g., on a user interface of the first device 102) for establishing the virtual space 110. Responsive to the selection, the first device 102 may prompt the user to acquire the spatial information 108 of the physical space 106. The user may control the first device 102 to acquire the spatial information 108 of the physical space 106 (e.g., in response to the prompt on the first device 102).

The first device 102 may be configured acquire the spatial information 108 by scanning the physical space 106. The user of the first device 102 may be configured to move the first device 102 spatially about the physical space 106 to scan the physical space 106 in one or more directions. The first device 102 may be configured to acquire spatial information 108 of the physical space 106 as the user moves the first device 102 about the physical space 106. As the first device 102 scans the physical space 106, the sensor(s) 112 may be configured to capture data corresponding to the physical space 106. The first device 102 may be configured to capture data corresponding to boundaries of the physical space 106 including, for instance, walls, a ceiling, floors, etc. Collectively, the boundaries of the physical space 106 may include a boundary description of the physical space 106 (e.g., one or more walls, ceiling, floors, etc. which together define, confine, or otherwise enclose the physical space 106). The first device 102 may be configured to capture a series of images representative of the physical space 106 as the first device 102 scans the physical space 106, range or distance data representative of the physical space as the first device 102 scans the physical space 106, and so forth.

The first device 102 may be configured to generate a three-dimensional (3D) point cloud representative of at least a portion of the physical space 106. The 3D point cloud may be a spatial representation of the physical space of the first device 102. The 3D point cloud may include or correspond to points which represent a location of various surfaces, objects and/or features within the physical space 106 to the first device 102. The first device 102 may be configured to generate the 3D point cloud according to the acquired spatial information 108. The first device 102 may be configured to compile the spatial information 108 (e.g., captured by the sensor(s) 112) as the first device 102 scans the physical space 106. The first device 102 may be configured to generate the 3D point cloud using the compiled spatial information 108. Where the first device 102 captures a series of images (e.g., via the sensor(s) 112), the first device 102 may be configured to compile the series of images to generate a stereoscopic set of images corresponding to the physical space 106. The first device 102 may be configured to analyze difference between the stereoscopic set of images to detect distances between various portions of the images and the first device 102. The first device 102 may be configured to use the detected distances for building, constructing, compiling, or otherwise generating the 3D point cloud. Where the first device 102 captures range and/or distance data (e.g., via the sensor(s) 112), the first device 102 may be configured to compile the range and/or distance data to generate the 3D point cloud. In these and other embodiments, the first device 102 may be configured to generate a 3D point cloud which represents dimensions, spatial relationships, and so forth of the physical space 106 of the first device 102.

The first device 102 may be configured to establish a virtual space 110 based on the physical space 106 according to the spatial information 108. The virtual space 110 may be accessible by a user of the first device 102 via the first device 102. The first device 102 may be configured to establish the virtual space 110 using the spatial information 108 (e.g., generated, acquired, or otherwise captured by the first device 102). The first device 102 may be configured to establish the virtual space 110 based on dimensions of the physical space 106 as represented by or otherwise corresponding to the spatial information 108. In some embodiments, the first device 102 may be configured to establish the virtual space 110 with one or more dimensions smaller than that of the physical space 106. The first device 102 may be configured to establish the virtual space 110 with one or more dimensions smaller than that of the physical space 106, by subtracting, shrinking, or otherwise restricting the dimensions corresponding to the physical space 106 for setting the dimensions of the virtual space 110. The first device 102 may be configured to define the virtual space 110 within a space which is smaller than the physical space 106 such that at least one boundary of the virtual space 110 may be defined along a perimeter of the physical space 106. The first device 102 may be configured to identify the perimeter of the physical space 106 based on an outermost object or surface along the wall(s), floor, or ceiling of the physical space 106.

The first device 102 may be configured to maintain, include, or otherwise access a user representation 200 (of FIG. 2) corresponding to a user of the first device 102 (or corresponding to the first device 102). The user representation may include a visual indicator and/or virtual representation of the user and/or the first device (e.g., an avatar, a cursor, a positioning marker) in the virtual space. The first device 102 may be configured to provide, include, or otherwise incorporate the user representation 200 in the virtual space 110 at a location within the virtual space 110 corresponding to a location of the first device 102 within the physical space 106. As the user controls the first device 102, the first device 102 may correspondingly update a position and/or orientation of the first device 102 within the virtual space 110. As such, the user representation 200 within the virtual space 110 may track, mirror or reflect the movement of the user of the first device 102 within the physical space 106.

The first device 102 may include a network interface 114. The network interface 114 may include or correspond to any device(s), component(s), element(s), and/or combinations of hardware and software designed or implemented to establish or facilitate establishment of a connection to a network. The network interface 114 may be configured to establish or facilitate establishment of a connection to a Wi-Fi network, Bluetooth network, or other local area network within the physical space 106. In some embodiments, the network interface 114 may be similar in some respects to the network interface 420 shown in FIG. 4 and subsequently described. As described in greater detail below, the first device 102 may be connected to one or more second device(s) 104 via the network interface 114. The first device 102 may be configured to register (e.g., via a device registration engine 116) the second device(s) 104 with the virtual space 110 such that users of the second device(s) 104 can interact within the virtual space 110 via their respective devices 104.

The system 102 is shown to include one or more second device(s) 104. In some embodiments, the second device(s) 104 may include any device or component configured to capture, detect, register, or otherwise obtain spatial information of the physical space 106 of the second device(s) 104. The second device(s) 104 may be configured to generate, configure, define, or otherwise establish a virtual space 110 corresponding to the physical space 106 based on the spatial information 108. The second device(s) 104 may include a master (or primary) device corresponding to the virtual space 110. In this regard, the second device(s) 104 may be responsible for establishing and controlling enrollment of the objects, other devices (such as the first device(s) 102), etc. with the virtual space 110. In certain embodiments, the second device(s) 104 are slave (or secondary) device(s) that register with/through a first device 102 to gain access to the spatial information and/or the virtual space 110.

The second device(s) 104 may include virtual reality (VR) device(s). The second device(s) 104 may include a mobile device, tablet device, gaming system, laptop or desktop computer, wearable device, etc. The second device(s) 104 may be configured for a particular modality. For instance, the second device(s) 104 may be configured for a modality corresponding to a VR environment (e.g., included in the virtual space 110). A user of the second device(s) 104 may provide inputs (e.g., via the second device(s) 104) for interacting in (e.g., experiencing, navigating, manipulating, using and/or controlling) the VR environment. In some embodiments, the second device(s) 104 may include one or more elements and/or features of the device shown in FIG. 4 and subsequently described. The user may provide inputs for interacting with or controlling a virtual character (e.g., an avatar) in the VR environment. The second device(s) 104 may include a wearable device (e.g., including a head-mounted display).

The second device(s) 104 may include an input device communicably coupled to the wearable device. Together, the user may operate the input device and second device(s) 104 to provide inputs for controlling a virtual character's actions within an VR environment. The user may control the virtual character's actions through various human-computer interface components and capabilities. In some implementations, the input device may include a joystick (physical or virtual), controller, keyboard, mouse, touchpad or other device including a plurality of buttons. The user may provide inputs to the input device for controlling the actions of the virtual character.

In some embodiments, some of the second device(s) 104 may include VR devices, while other devices 104 may include AR devices. Furthermore, the first device 102 may be a VR device (or other type of device) while the second device 104 is an AR device (or another VR device, a personal computer (PC) or other type of device). In other words, the present disclosure is not limited to a particular arrangement or type of device for the first and/or second device 102, 104. However, generally speaking, the second device(s) 104 may be considered subordinate to the first device 102. As stated above, the first device 102 may be a master (or primary) device, and the second device(s) 104 may be slave (or secondary) device(s). The first device 102 may be configured to establish the virtual space 110 as described above, and the second device(s) 104 may be configured to be registered with the virtual space 110 established by the first device 102. In such embodiments, the system 100 leverages mobility and scanning capabilities of the first device 102 for capturing the spatial recognition 108, which in turn is used (e.g., by the first device 102) for establishing the virtual space 110. The second device(s) 104 correspondingly are registered with the virtual space 110 (e.g., through the first device 102) such that users of the second device(s) 104 can interact within the virtual space 110 (established by the first device 102) using their second device(s) 104. The virtual space 110 can include boundaries, features, avatars/representations of users, and/or objects—aspects of which can be rendered and/or translated accordingly (e.g., as a VR, AR, mixed reality or other type of space to each specific user) to support one or more modalities (e.g., to support a user of a VR device, a user of an AR device, a user of a PC, and/or a user of another type of device, which may all be co-located in the same virtual space 110, or not), at the same time.

Figure 2:
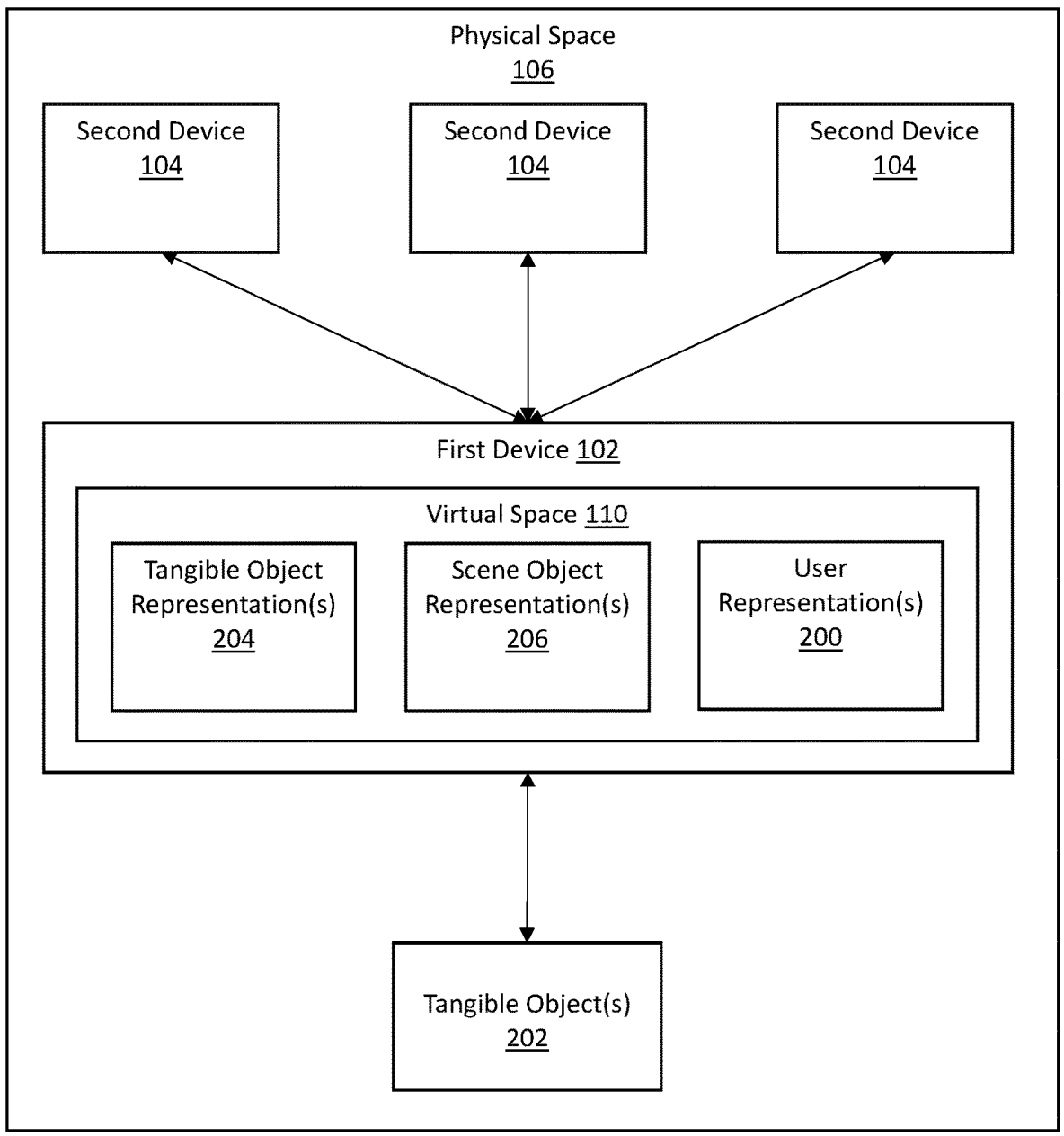
FIG. 2 is a diagram of a physical space in which the system of FIG. 1 may be implemented, according to an example implementation of the present disclosure.

Referring to FIG. 1 and FIG. 2, the second device(s) 104 may be located in the same physical space 106 as the first device 102. Specifically, FIG. 2 shows a view of a physical space 106 including the first device 102 and second device(s) 104, according to an illustrative embodiment. As shown in FIG. 2, the physical space 106 of the first device 102 includes a plurality of second device(s) 104. Some of those second device(s) 102 may be VR devices, while other of the second device(s) 104 may include AR devices and/or other type(s) of devices. In either implementation, the second device(s) 104 may be secondary to the first device 102 in that the second device(s) 104 rely on the first device 102 for capturing the spatial information 108 corresponding to the physical space 106 and/or establishing the virtual space 110 corresponding to the physical space 106 (e.g., of both the first and second device(s) 102, 104) based on the spatial information 108.

Similar to the first device 102, the second device(s) 104 may include a network interface 118. The network interface 118 of the second device(s) 104 may be substantially the same as the network interface 114 of the first device 102. The network interface 118 may be any device(s), component(s), element(s), and/or combinations of hardware and software designed or implemented to establish or facilitate establishment of a connection to a network. In implementations in which the first device 102 and second device(s) 104 are located in the same physical space 106, the first device 102 and second device(s) 104 may be connected to a common network (e.g., a common Wi-Fi network). As such, the first device 102 and second device(s) may be communicably coupled to one another via the common network. In some embodiments, the first device 102 and second device(s) 104 may be communicably coupled to one another via a different wireless connection (such as a Bluetooth connection). In some embodiments, the first device 102 and second device(s) 104 may be communicably coupled to one another directly, e.g., in a peer to peer configuration. In these and other embodiments, the first device 102 and second device(s) 104 may be communicably coupled to one another (and/or to a management device of the virtual space) to exchange or facilitate exchange of data between the first and second device(s) 102, 104 (e.g., corresponding to the virtual space 110).

As shown in FIG. 1, the first device 102 and second device(s) 104 may include respective device registration engines 116, 120. The device registration engine 116 of the first device 102 may include any device(s), component(s), element(s), script(s), and/or combination of hardware and/or software designed or implemented to register a device with a virtual space 110 established by the first device 102. Similarly, the device registration engine 120 of the second device 102 may include any device(s), component(s), element(s), script(s), and/or combination of hardware and/or software designed or implemented to register with a virtual space 110 established by a device. In some implementations, the first device 102 may initiate registration of the second device(s) 104. In some implementations, the second device(s) 104 may initiate registration with the first device 102. In these and other implementations, as the first device 102 establishes, defines and/or maintains the virtual space 110, the first device 102 may be configured to register other devices (e.g., the second device(s) 104) with the virtual space 110 to access the virtual space 110.

In some embodiments, the first device 102 may be configured to initiate registration of the second device(s) 104. For instance, a user of the first device 102 may select an option (e.g., on a user interface) for registering another device (e.g., the second device(s) 104) located in the physical space 106, with the virtual space 110. The device registration engine 116 may be configured to receive the selection from the user, and generate a prompt for the user to capture, record, or otherwise obtain and/or provide identification information for registering the second device(s) 104. The identification information may include a unique identifier (e.g., a PIN, code, alphanumeric password, etc.) associated with a user of the other device, or the other device itself. In such implementations, the user may receive the identification information from the other device 104 or from user(s) of the other device 104, and input the identification information to the first device 102. In some embodiments, the second device 104 may initiate registration of the second device 104 with the virtual space 110. A user of the second device 104 may select an option (e.g., on a user interface of the second device 104) to request registration of the second device 104 with the virtual space 110. The device registration engine 120 may receive the selection and transmit a request to the first device 102. In some embodiments, the request may include the identification information corresponding to the second device 104. In other embodiments, the request may prompt the first device 102 to obtain the identification information. In these and other embodiments, the device registration engine 116 may generally obtain the identification information corresponding to the second device 104 (or user of the second device 104) for registering the second device 104 (and, correspondingly, representing the user of the second device 102) with the virtual space 110. The first device 102 may for instance register the second device 104 with a management device (or server) of the virtual space 110, by authorizing the second device 104 to access the management device and/or the virtual space 110.

The identification information may include or correspond to a marker for the device 104. The marker may be positioned on a surface of the device 104. The marker may be selected by a user of the second device 104. Various examples of markers may include, for instance, images, codes (e.g., QR or bar codes), combinations of colors and shapes, etc. In such implementations, the first device 102 may prompt the user to scan a marker for the second device 104. The user may operate the first device 102 to scan the marker of the device 104. The device registration engine 116 may parse the scanned marker to identify the identification information (or data associated with the identification information) corresponding to the device 104 and/or user of the device 104. For instance, where the marker is a QR code in which the identification information is encoded therein, the first device 104 may parse, translate or analyze the QR code to extract, determine, or otherwise identify the identification information. As another example, where the marker includes an image, the first device 104 may parse the image to determine visual characteristics of the image (e.g., what the image includes, colors or shapes included in the image, objects included in the image, etc.). The first device 104 may be configured to use the visual characteristics of the image to determine the identification information for the second device 104 (or user of the second device 104).

In some embodiments, the device registration engine 116 may include, maintain, or otherwise access a database, memory, or other type or form of data structure. The data structure may include identification information corresponding to users (or device(s) corresponding to specific users) and visual representations of the associated user. In implementations in which the marker is an image, the data structure may include visual characteristics corresponding to the image, identification information corresponding to the user/device associated with the image, and/or a visual representation of the associated user. The first device 102 may be configured to perform a look-up in the data structure to identify the user and/or second device 104 (e.g., using the identification information, using the visual characteristics of the marker, etc.). In some embodiments, the first device 102 may be configured to prompt a user of the first device 102 and/or cause the second device 104 to prompt a user of the second device 104 to confirm the identification information or otherwise confirm the identity of the user of the second device 104 to be registered with the virtual space 110. The first device 102 may be configured to identify (e.g., responsive to receiving confirmation from the user of the first and/or second device 102, 104) a user representation 200 of the user of the second device 104. The user representation 200 may be, for instance, an avatar set up by or otherwise associated with the user of the second device 104 and/or the second device 104 itself. The first device 102 may be configured to represent the user in the virtual space 110 with the user representation 200 corresponding to the user/second device 104.

The first device 102 may be configured to share and/or receive information corresponding to the virtual space 110 and/or physical space 106 with the second device(s) 104. In some instances, the first device 102 may be configured to share (or authorize another device such as a management device of the virtual space, to share) information corresponding to the spatial information 108 of the physical space 106, a location of the first device 102 in relation to the physical space 106 or the virtual space 110, and/or an orientation of the first device 102 in relation with the physical space 106 or the virtual space 110. The second device 104 may be configured to render an updated version of the virtual space 110 that includes a modified position of the user representation 200 based on such information corresponding to the first device 102. Similarly, the first device 102 may be configured to receive such information corresponding to the second device 104. The first device 102 may be configured to receive the information corresponding to the second device 104 directly from the second device 104, from a different device (e.g., a third device, such as a server), and so forth. The third device may also be located in the physical space 106 (such as a network device or router, an additional second device 104, a management device of the virtual space, etc.), or the third device may be located remotely from the physical space 106. The third device (e.g., a server) may be configured to maintain information corresponding to the respective devices. The information may include, for instance, location or orientation information of the second device 104 (e.g., relative to the first device 102, within the physical space 106 or virtual space 110, etc.). The first device 102 may be configured to update the virtual space to reflect the information received by the first device 102 and corresponding to the second device 104.

In some embodiments, the first device 102 may be configured to detect and register tangible objects 202 of the physical space 106 (e.g., located within the physical space) with the virtual space 110. Similar to registering additional devices with the virtual space 110, the user of the first device 104 may select an option on the first device 102 (e.g., via a user interface of the first device 102) to register tangible objects 202 with the virtual space 110. The first device 102 may prompt the user to provide object information corresponding to the tangible object 202 to the first device 102. The object information may include, for instance, object type, object dimensions, etc. In some embodiments, the first device 102 may be configured to register tangible object(s) 202 with the virtual space 110 by scanning a marker of the object 202 (e.g., similar to the marker described above). The first device 102 may perform a look-up function using data corresponding to the marker in a data structure (e.g., similar to the data structure identified above) to identify tangible object representation(s) 204 corresponding to the tangible object 202. The first device 102 may be configured to provide a tangible object representation 204 in the virtual space 110 for the first and second devices 102, 104 (e.g., according to the scanned marker). As such, users operating devices which are registered with the virtual space 110 can interact with the tangible object 202 and, correspondingly, the tangible object representation 204 (e.g., as a virtual object) in the virtual space. The first device 102 may be configured to track movement of the marker for the object 202 and, correspondingly, update the position/orientation of the tangible object representation 204 in the virtual space 110 to reflect the movement of the marker for the object 202.

In some embodiments, the virtual space 110 may include scene object representations 206. The first device 102 may be configured to generate, define, or otherwise provide the scene object representations 206 in the virtual space 110. The scene object representations 206 may correspond to virtual objects included in the virtual space 110 (e.g., as part of a virtual scene) but not tangible objects 200 in the physical space 106. In other words, the scene object representations 206 may be strictly virtual (without corresponding to a physical object), whereas the tangible object representations 204 may be virtual representations of physical objects. Users of the first and second devices 102, 104 can interact with the scene object representations 206 within the virtual space 110 by providing corresponding inputs to their respective devices 102, 104. On the other hand, those users can interact with the tangible object representations 204 within the virtual space 110 by interacting with the tangible object 202 in the physical space 106.

Figure 3:
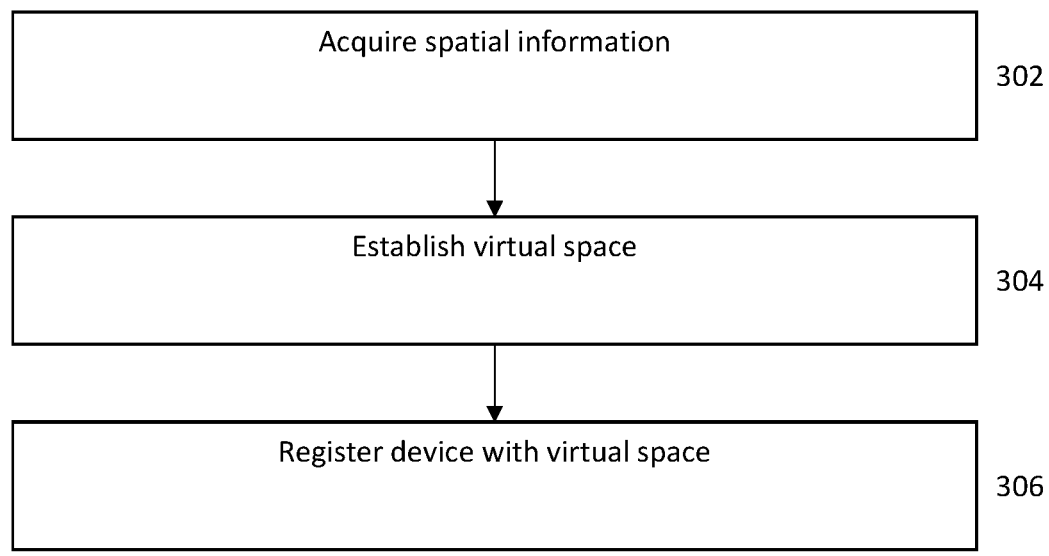
FIG. 3 is a flow chart illustrating a process of maintaining a virtual space, according to an example implementation of the present disclosure.

Referring now to FIG. 3, depicted is a flowchart showing a process 300 of establishing and/or using a virtual space, according to an illustrative embodiment. The steps of the method 300 may be implemented by the components and elements described above with reference to FIG. 1-FIG. 2, such as the first device 102 and/or the second device. In brief overview, at step 302, a first device acquires spatial information. At step 304, the first device establishes a virtual space. At step 306, the first device registers devices with the virtual space.

At step 302, and in some embodiments, a first device acquires spatial information. In some embodiments, the first device may acquire spatial information of a physical space of the first device. The first device may include or correspond to an augmented reality (AR) device which is capable of acquiring spatial information (as opposed to other types or forms of devices which do not have such capabilities, which may include the second device). The first device may acquire the spatial information responsive to receiving a selection (e.g., by the user of the first device) to establish a virtual space corresponding to the physical space. The spatial information may include, for instance, dimensions, proportions, sizes, etc., of various surfaces or features of the physical space, orientations of surfaces or features of the physical space, and/or other boundary descriptions of the physical space. The first device may acquire the spatial information using various sensor(s) of the first device, which enable the first device to acquire such spatial information. In some embodiments, the first device may scan various portions of the physical space to acquire the spatial information. The user may rotate, move, or otherwise manipulate the first device about the physical space to direct such sensor(s) about the physical space. The sensor(s) can capture, detect, register, or otherwise acquire sensor data corresponding to the spatial information.

The first device may analyze, process, or otherwise parse the spatial information to identify or determine a size, geometry, or other boundary description of the physical space. For instance, the first device may identify or determine distance measurements between the first device and various surfaces of the physical space. In some embodiments, the first device may generate a three-dimensional (3D) point cloud representative of at least a portion of the physical space. The 3D point cloud may include or correspond to the distance measurements identified or determined by the first device. The first device may generate the 3D point cloud to determine or provide the boundary description of the physical space. The first device may generally use the boundary description for establishing a virtual space, as described in greater detail below.

At step 304, and in some embodiments, the first device establishes a virtual space. In some embodiments, the first device establishes the virtual space according to the acquired spatial information (e.g., acquired at step 302). The virtual space may be accessible by a user of the first device via the first device. The virtual space established by the first device may correspond in one or more spatial aspects to the physical space. In some embodiments, the virtual space may follow, track, implement or otherwise represent the boundary description of the physical space. In some embodiments, the virtual space may be defined within a space (or dimensions) that is smaller than that of the physical space. For instance, the virtual space may be defined within the boundaries of the physical space. The first device may establish the virtual space by scaling down dimensions of the physical space as represented within the acquired spatial information, for instance. The virtual space may include various representations (or virtual features). Some representations may represent objects or users located in the physical space (such as users of the first device, other devices, tangible objects which are located in the physical space, etc.). Some representations may correspond to a virtual scene and, thus, not correspond to objects or users in the physical space (such as scene object representations). As described in greater detail below, where new devices and objects are registered with the virtual space, the first device may correspondingly update the virtual space to include representations corresponding to those newly registered devices and objects.

At step 306, and in some embodiments, the first device registers devices with the virtual space. In some embodiments, the first device may register a second device within the physical space to allow or authorize a user of the second device to access the virtual space via the second device. In some embodiments, the second device may be a device which is not capable of acquiring spatial information of the physical space for establishing the virtual space. For instance, the second device may be a virtual reality (VR) device. In some embodiments, the first device may register a plurality of second devices. Some of the second devices may be VR devices, other second devices may be AR devices, etc. In these and other embodiments, the first device may be a primary device responsible for establishing and maintaining the virtual space, and registering secondary devices with the virtual space.

The first device may register the second device based on data from the second device. The data from the second device may be or include data which is received or detected from the second device, data which is captured from, received from, or otherwise corresponding to the second device or a user of the second device, data that is included within an image of the second device, etc. In some embodiments, the first device may register the second device responsive to receiving a request (e.g., from the second device or its user) to register with the virtual space. The first device may register the second device responsive to receiving a selection (e.g., from a user of the first device) to register the second device located in the same physical space as the physical space of the first device. The first device may prompt the user to provide identification information corresponding to the second device to the first device for registering the second device. The identification information may be uniquely associated with the second device. The identification information may be or include a PIN, a password or passcode, etc. The identification information may correspond to a marker of the second device. The marker may include an image, QR or bar code, combination of various shapes and colors, etc., which is uniquely associated with the second device. The marker may be located on a surface, exterior or visible portion of the second device. The marker may be included in a wireless signal or audio signal from the second device. The first device may scan, detect or identify the marker of the second device. The first device may capture an image of the marker for identifying the second device (or use of the second device). The first device may process, parse, or otherwise analyze the image of the marker to identify visual characteristics of the marker. The first device may perform a look-up in a database using the visual characteristics of the marker to identify the identification information. In certain embodiments, the first device may send information of the marker and/or the identification information to another device, such as a management device of the virtual space, to register and/or authorize the second device or its user to access the virtual space.

The first device (and/or the management device) may use the identification information to identify the second device or a user of the second device. In some embodiments, the first device (and/or the management device) may use the identification information to identify a user representation corresponding to the second device. The first device (and/or the management device) may include the user representation in the virtual space (e.g., established at step 304). The first device (and/or the management device) may identify the user representation by performing a look-up function using the identification information in a database including user representations and corresponding identification information. The first device (and/or the management device) may include the user representation corresponding to the identification information in the virtual space. As a user of the second device interacts in the virtual space, the first device (and/or the management device) may correspondingly update the position and/or orientation of the user representation in the virtual space.

In some embodiments, the first and second devices may be connected to a common network (such as a Wi-Fi Network, a Bluetooth network, or other local area network). The first and second device may be connected to a common network to facilitate exchange of data and information corresponding to the virtual space, via the common network. The first and second devices may connect directly to each other in certain embodiments, or may share information via a management device for the virtual space. For instance, the first device may share information with the second device, and the second device may share information with the first device. The first device may share information corresponding to the spatial information of the physical space (e.g., acquired at step 302) with the second device (and/or the management device). The second device (and/or the management device) may use such information for representing boundaries of the physical space and/or virtual space to a user of the second device. The first device may share a location or orientation of the first device in relation to the physical or virtual space with the second device (and/or the management device). The second device (and/or the management device) may use the location/orientation of the first device for updating a rendering of the virtual space to a user of the second device. The first device (and/or the management device) may receive location and/or orientation information corresponding to the second device. The first device (and/or the management device) may receive such location/orientation information corresponding to the second device either directly from the second device, or from one or more other devices (e.g., other devices located in the physical space, via a network device which communicably couples the first and second device, etc.). The first device (and/or the management device) may use the location/orientation information corresponding to the second device for updating the user representation corresponding to the second device in the virtual space. As such, virtual movements of the user representation corresponding to the second device within the virtual space may track or otherwise reflect physical movements of a user of the second device in the physical space.

In some embodiments, the first device may register tangible objects or features (e.g., of the physical space) with the virtual space. The first device may register tangible objects with the virtual space by detecting those objects in the physical space. Similar to registering devices, the first device may register objects or features responsive to receiving a (user) request or selection to register such objects or features. The first device may detect the object or feature in the physical space (e.g., as part of registering the object or feature with the virtual space). In some embodiments, the first device may scan the object to detect a marker (e.g., similar to the marker described above) of the object. The first device may identify object characteristics (e.g., size, weight, type, etc.) of the object based on the marker. The first device may identify a tangible object representation of the object based on the marker (similar to identifying user representations for devices). The first device may provide a representation of the object or feature in the virtual space. As such, both first and second devices can interact with the object in the physical space while interacting with the representation in the virtual space. For instance, a user of the first or second device may move the object in the physical space. As the object is moved in the physical space, the marker can correspondingly move. The first device may detect movement of the marker for the object in the physical space. The first device may correspondingly update an orientation and/or location of the representation of the object in the virtual space (e.g., based on the movement of the marker in the physical space as detected by the first device).

Various operations described herein can be implemented on computer systems. FIG. 4 shows a block diagram of a representative computing system 414 usable to implement the present disclosure. In some embodiments, the server 102, client device 104, adapter 106, or each of FIG. 1 are implemented by the computing system 414. Computing system 414 can be implemented, for example, as a consumer device such as a smartphone, other mobile phone, tablet computer, wearable computing device (e.g., smart watch, eyeglasses, head mounted display), desktop computer, laptop computer, or implemented with distributed computing devices. The computing system 414 can be implemented to provide VR, AR, MR experience. In some embodiments, the computing system 414 can include conventional computer components such as processors 416, storage device 418, network interface 420, user input device 422, and user output device 424.

Network interface 420 can provide a connection to a wide area network (e.g., the Internet) to which WAN interface of a remote server system is also connected. Network interface 420 can include a wired interface (e.g., Ethernet) and/or a wireless interface implementing various RF data communication standards such as Wi-Fi, Bluetooth, or cellular data network standards (e.g., 3G, 4G, 5G, 60 GHz, LTE, etc.).

User input device 422 can include any device (or devices) via which a user can provide signals to computing system 414; computing system 414 can interpret the signals as indicative of particular user requests or information. User input device 422 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 424 can include any device via which computing system 414 can provide information to a user. For example, user output device 424 can include a display to display images generated by or delivered to computing system 414. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 424 can be provided in addition to or instead of a display. Examples include indicator lights, speakers, tactile "display" devices, printers, and so on.

Some implementations include electronic components, such as microprocessors, storage and memory that store computer program instructions in a computer readable storage medium. Many of the features described in this specification can be implemented as processes that are specified as a set of program instructions encoded on a computer readable storage medium.

When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 416 can provide various functionality for computing system 414, including any of the functionality described herein as being performed by a server or client, or other functionality associated with message management services.

It will be appreciated that computing system 414 is illustrative and that variations and modifications are possible. Computer systems used in connection with the present disclosure can have other capabilities not specifically described here. Further, while computing system 414 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

The invention claimed is:

1. A method, comprising:
 acquiring, by a first device, spatial information of a physical space of the first device;
 establishing, by the first device according to the acquired spatial information, a virtual space corresponding to the physical space, that is accessible by a user of the first device via the first device; and
 registering, by the first device, a second device within the physical space in which the first device is located concurrently with the second device, to allow a user of the second device to access the virtual space concurrently with the first device via the second device, while both the first device and the second device are located concurrently within the physical space.

2. The method of claim 1, further comprising scanning, by the first device, the physical space to acquire the spatial information, the spatial information comprising a boundary description of the physical space.

3. The method of claim 2, further comprising generating, by the first device according to the acquired spatial information, a three dimensional point cloud representative of at least a portion of the physical space.

4. The method of claim 1, further comprising sharing, by the first device with the second device, information comprising at least one of the spatial information of the physical space, a location of the first device in relation to the physical space or the virtual space, or an orientation of the first device in relation with the physical space or the virtual space.

5. The method of claim 1, wherein registering the second device comprises:
 identifying, by the first device, the second device or a user of the second device.

6. The method of claim 1, wherein the first device and second device are connected to a common network.

7. The method of claim 1, comprising:
 receiving, by the first device, at least one of location or orientation information of the second device, from a third device or directly from the second device.

8. The method of claim 1, comprising:
 detecting, by the first device, an object or feature of the physical space; and
 providing a representation of the object or feature in the virtual space for the first device and the second device.

9. The method of claim 8, comprising:
 scanning, by the first device, a marker of the object;
 providing a representation of the object within the virtual space according to the scanned marker; and
 updating, according to movement of the marker, an orientation and location of the representation of the object in the virtual space.

10. A non-transitory computer readable medium storing instructions when executed by one or more processors cause the one or more processors to:
 acquire a spatial information of a physical space of the first device; and
 establish, according to the acquired spatial information, a virtual space corresponding to the physical space, that is accessible by a user of the first device via the first device; and
 register a second device within the physical space in which the first device is located concurrently with the second device, to allow a user of the second device to access the virtual space concurrently with the first device via the second device, while both the first device and the second device are located concurrently within the physical space.

11. A first device, comprising:
 at least one sensor configured to acquire a spatial information of a physical space of the first device; and
 at least one processor configured to:
 establish, according to the acquired spatial information, a virtual space corresponding to the physical space, that is accessible by a user of the first device via the first device; and
 register a second device within the physical space in which the first device is located concurrently with the second device, to allow a user of the second device to access the virtual space concurrently with the first device via the second device, while both the first device and the second device are located concurrently within the physical space.

12. The first device of claim 11, wherein the at least one sensor is configured to scan the physical space to acquire the spatial information, the spatial information comprising a boundary description of the physical space.

13. The first device of claim 12, wherein the at least one processor is configured to generate, according to the acquired spatial information, a three dimensional point cloud representative of at least a portion of the physical space.

14. The first device of claim 11, wherein the at least one processor is configured to share, with the second device, information comprising at least one of the spatial information of the physical space, a location of the first device in relation to the physical space or the virtual space, or an orientation of the first device in relation with the physical space or the virtual space.

15. The first device of claim 11, wherein the at least one processor is configured to register the second device by identifying the second device or a user of the second device.

16. The first device of claim 11, wherein the first device and second device are connected to a common network.

17. The first device of claim 11, further comprising a network interface configured to receive at least one of location or orientation information of the second device, from a third device or directly from the second device.

18. The first device of claim 11, wherein the at least one processor is configured to:
 detect an object or feature of the physical space; and
 provide a representation of the object or feature in the virtual space for the first device and the second device.

19. The first device of claim 18, wherein the at least one sensor is configured to scan a marker of the object, and the at least one processor is configured to:
 provide a representation of the object within the virtual space according to the scanned marker; and update, according to movement of the marker, an orientation and location of the representation of the object in the virtual space.

20. The first device of claim 11, wherein the first device comprises an augmented reality device and the second device comprises a virtual reality device.

* * * * *